US012773742B2

(12) United States Patent
Miyazaki

(10) Patent No.: US 12,773,742 B2
(45) Date of Patent: Oct. 27, 2026

(54) ROTARY CUTTING TOOL

(71) Applicant: SUMITOMO ELECTRIC HARDMETAL CORP., Hyogo (JP)

(72) Inventor: Yuma Miyazaki, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 309 days.

(21) Appl. No.: 18/569,858

(22) PCT Filed: Jun. 15, 2022

(86) PCT No.: PCT/JP2022/023973
§ 371 (c)(1),
(2) Date: Dec. 13, 2023

(87) PCT Pub. No.: WO2023/276672
PCT Pub. Date: Jan. 5, 2023

(65) Prior Publication Data
US 2024/0286211 A1 Aug. 29, 2024

(30) Foreign Application Priority Data
Jun. 28, 2021 (JP) ................................ 2021-106571

(51) Int. Cl.
*B23D 77/02* (2006.01)

(52) U.S. Cl.
CPC .......... *B23D 77/02* (2013.01); *B23D 2277/04* (2013.01)

(58) Field of Classification Search
CPC ..... B23D 2277/04; B23B 77/02; B23B 77/00; B23C 5/10
See application file for complete search history.

(56) References Cited

U.S. PATENT DOCUMENTS

| | | | |
|---|---|---|---|
| 2020/0215631 A1 | 7/2020 | Sasagawa et al. |
| 2021/0245276 A1 | 8/2021 | Tanaka et al. |
| 2021/0245277 A1 | 8/2021 | Tanaka et al. |
| 2024/0286211 A1 | 8/2024 | Miyazaki |

FOREIGN PATENT DOCUMENTS

| | | |
|---|---|---|
| CN | 103071815 A | 5/2013 |
| CN | 111032264 A | 4/2020 |
| JP | H06-031919 U | 4/1994 |

(Continued)

OTHER PUBLICATIONS

Keizo Sakuma et al., "Hole Accuracy with Carbide-tipped Reamers (4th Report)", Precision Engineering, 48(6), Jun. 1982 (cited in specification, with English Abstract).

(Continued)

*Primary Examiner* — Moshe Wilensky
(74) *Attorney, Agent, or Firm* — Renner, Otto, Boisselle & Sklar, LLP

(57) ABSTRACT

A rotary cutting tool includes a first cutting blade, a second cutting blade, a third cutting blade, a fourth cutting blade, and a fifth cutting blade on a circumference, in which a rotation angle from the first cutting blade to the second cutting blade is 60±1°, a rotation angle from the second cutting blade to the third cutting blade is 75±1°, a rotation angle from the third cutting blade to the fourth cutting blade is 60±1°, a rotation angle from the fourth cutting blade to the fifth cutting blade is 75±1°, and a rotation angle from the fifth cutting blade to the first cutting blade is 90±1°.

4 Claims, 6 Drawing Sheets

(56) References Cited

FOREIGN PATENT DOCUMENTS

| | | | |
|---|---|---|---|
| JP | 2011-062790 | A | 3/2011 |
| JP | 2012-91306 | A | 5/2012 |
| JP | 2018-183854 | A | 11/2018 |
| JP | 7555491 | B2 | 9/2024 |
| WO | 2019/044791 | A1 | 3/2019 |
| WO | 2020/003679 | A1 | 1/2020 |
| WO | 2020/003680 | A1 | 1/2020 |

OTHER PUBLICATIONS

Vietnamese Office Action for corresponding Vietnamese Application No. 1-2023-08823, issued Mar. 4, 2026, with Machine Translation.

Chinese Office Action for corresponding Chinese Application No. 2022800462963, issued Jan. 16, 2026, with Machine Translation.

ROTARY CUTTING TOOL

TECHNICAL FIELD

The present invention relates to a rotary cutting tool. The present application claims priority based on Japanese Patent Application No. 2021-106571 filed on Jun. 28, 2021. The entire contents described in the Japanese patent application are incorporated herein by reference.

BACKGROUND ART

In the related art, rotary cutting tools are disclosed in, for example, WO 2020/003679 (PTL 1), WO 2020/003680 (PTL 2), Japanese Patent Laying-Open No. 2011-62790 (PTL 3), and Hole Accuracy with Carbide-tipped Reamers (4th Report) (Precision Engineering 48(6), June 1982) (NPL 1).

CITATION LIST

Patent Literature

PTL 1: WO 2020/003679
PTL 2: WO 2020/003680
PTL 3: Japanese Patent Laying-Open No. 2011-62790

Non Patent Literature

NPL 1: Hole Accuracy with Carbide-tipped Reamers (4th Report) (Precision Engineering 48(6), June 1982)

SUMMARY OF INVENTION

A rotary cutting tool according to an aspect of the present disclosure includes a first cutting blade, a second cutting blade, a third cutting blade, a fourth cutting blade, and a fifth cutting blade on a circumference, in which a rotation angle from the first cutting blade to the second cutting blade is 60±1°, a rotation angle from the second cutting blade to the third cutting blade is 75±1°, a rotation angle from the third cutting blade to the fourth cutting blade is 60±1°, a rotation angle from the fourth cutting blade to the fifth cutting blade is 75±1°, and a rotation angle from the fifth cutting blade to the first cutting blade is 90±1°.

DESCRIPTION OF EMBODIMENTS

Technical Problem

A rotary cutting tool in the related art has a problem that a feed mark is generated on a cut surface. Furthermore, there is a problem that circularity deteriorates.

Hereinafter, embodiments of the present disclosure will be described in detail with reference to the drawings.

Figure 1:
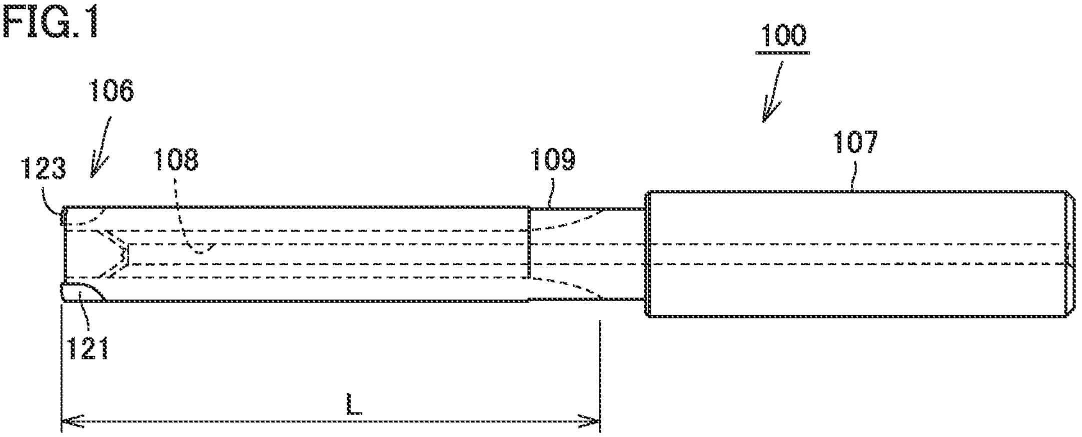
FIG. 1 is a front view of a reamer 100 as a rotary cutting tool according to an embodiment.

FIG. 1 is a front view of a reamer 100 as a rotary cutting tool according to an embodiment. As illustrated in FIG. 1, reamer 100 according to a first embodiment includes a base metal 109. A base portion 107 of base metal 109 has a columnar shape, and has a larger diameter than a tip portion 106.

A hole 108 is provided along a rotation center axis of base metal 109. A coolant is supplied to hole 108. The coolant is discharged from tip portion 106 of reamer 100, and the coolant is supplied to a contact portion between a workpiece and reamer 100. Base metal 109 is made of, for example, a cemented carbide or a steel material.

Figure 2:
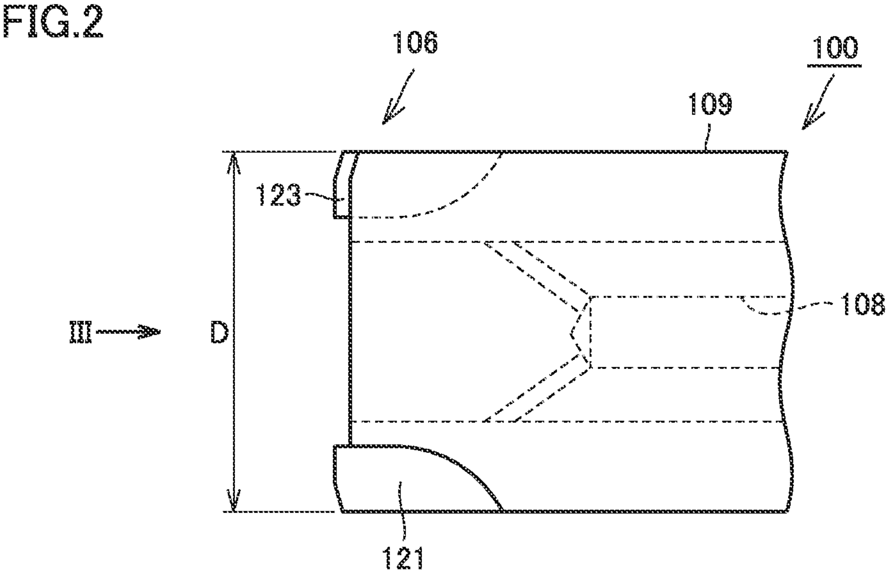
FIG. 2 is an enlarged view of a tip portion 106 of reamer 100 illustrated in FIG. 1.

FIG. 2 is an enlarged view of tip portion 106 of reamer 100 illustrated in FIG. 1. A first chip 121 and a third chip 123 are provided at tip portion 106 of reamer 100. Tip portion 106 is provided with other chips not illustrated in FIG. 2.

Figure 3:
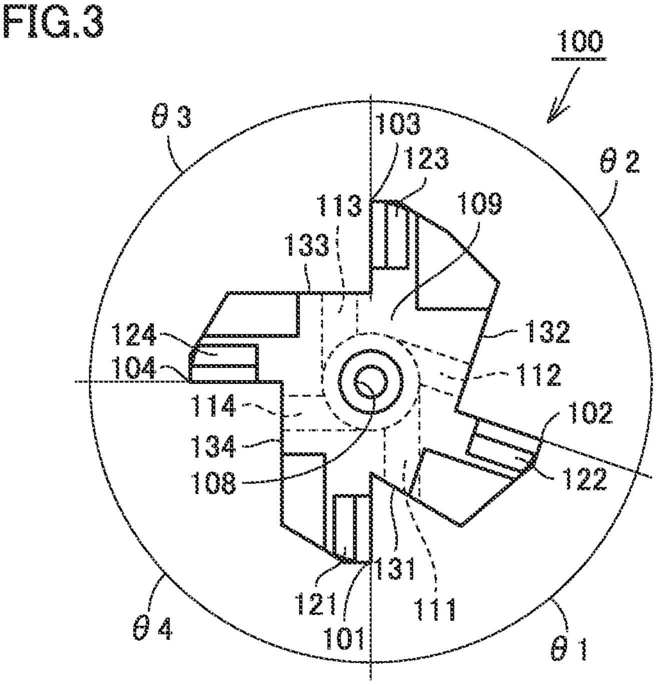
FIG. 3 is a side view of four-blade reamer 100 as viewed from a direction indicated by an arrow III in FIG. 2.

FIG. 3 is a side view of four-blade reamer 100 as viewed from a direction indicated by an arrow III in FIG. 2. As illustrated in FIG. 3, first chip 121 to a fourth chip 124 are provided on an outer circumference of base metal 109 of reamer 100.

First chip 121 to fourth chip 124 are provided with a first cutting blade 101 to a fourth cutting blade 104. First cutting blade 101 to fourth cutting blade 104 are portions that come into contact with the workpiece and process the workpiece. First chip 121 to fourth chip 124 are made of an ultra-hard tool material such as cemented carbide, diamond, or cubic boron nitride.

A rotation angle from first cutting blade 101 to second cutting blade 102 is θ1, a rotation angle from second cutting blade 102 to third cutting blade 103 is θ2, a rotation angle from third cutting blade 103 to fourth cutting blade 104 is θ3, and a rotation angle from fourth cutting blade 104 to first cutting blade 101 is θ4. θ1 to θ4 are arranged along a rotation direction at the time of cutting in the order of θ1, θ2, θ3, and θ4.

Base metal 109 is provided with four flutes 131 to 134. Four flutes 131 to 134 extend along a longitudinal direction of base metal 109.

Flutes 131 to 134 are provided with coolant holes 111 to 114 connected to hole 108. Accordingly, the coolant is supplied from hole 108 to coolant holes 111 to 114.

As an example, θ1 is 72±1°, θ2 is 108±1°, θ3 is 90±1°, and θ4 is 90±1°.

As another example, θ1 is 105±1°, θ2 is 90±1°, θ3 is 90±1°, and θ4 is 75±1°.

As another example, θ1 is 90±1°, θ2 is 90±1°, θ3 is 105±1°, and θ4 is 75±1°.

Figure 4:
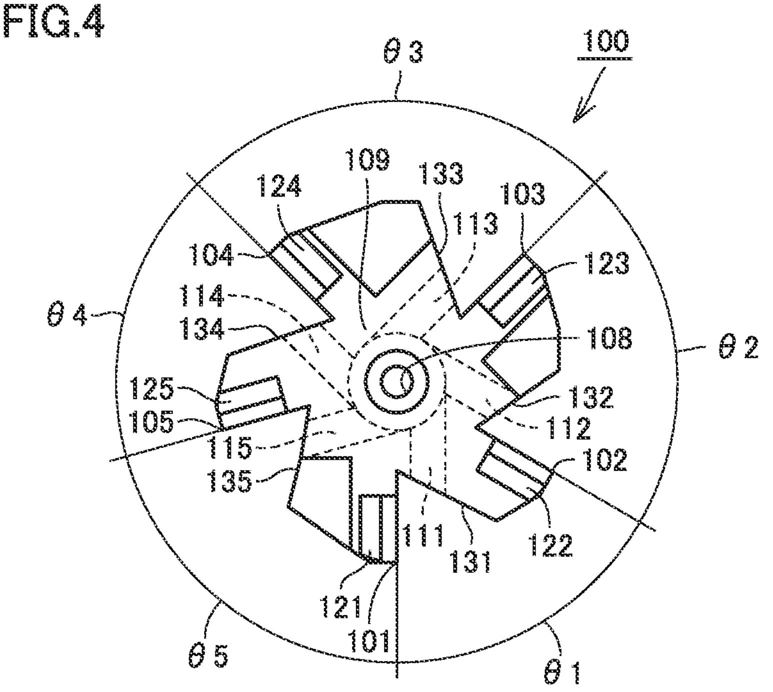
FIG. 4 is a side view of five-blade reamer 100 according to another embodiment.

FIG. 4 is a side view of five-blade reamer 100 according to another embodiment. As illustrated in FIG. 4, first chip 121 to a fifth chip 125 are provided on the outer circumference of base metal 109 of reamer 100. First chip 121 to fifth chip 125 are provided with first cutting blade 101 to a fifth cutting blade 105. First cutting blade 101 to fifth cutting blade 105 are portions that come into contact with the workpiece and process the workpiece. First chip 121 to fifth chip 125 are made of an ultra-hard tool material such as cemented carbide, diamond, or cubic boron nitride.

A rotation angle from first cutting blade 101 to second cutting blade 102 is θ1, a rotation angle from second cutting blade 102 to third cutting blade 103 is θ2, a rotation angle from third cutting blade 103 to fourth cutting blade 104 is θ3, a rotation angle from fourth cutting blade 104 to fifth cutting blade 105 is θ4, and a rotation angle from fifth cutting blade 105 to first cutting blade 101 is θ5.

Base metal 109 is provided with five flutes 131 to 135. Five flutes 131 to 135 extend along a longitudinal direction of base metal 109.

Flutes 131 to 135 are provided with coolant holes 111 to 115 connected to hole 108. Accordingly, the coolant is supplied from hole 108 to coolant holes 111 to 115. Coolant holes 111 to 115 may not be provided. Hole 108 may be opened or may not be opened at the tip of base metal 109.

As an example, θ1 is 60±1°, θ2 is 75±1°, θ3 is 60±1°, θ4 is 75±1°, and θ5 is 90=1°.

As another example, θ1 is 60±19, θ2 is 72±1°, θ3 is 60±1°, θ4 is 84±1°, and θ5 is 84=1°.

Figure 5:
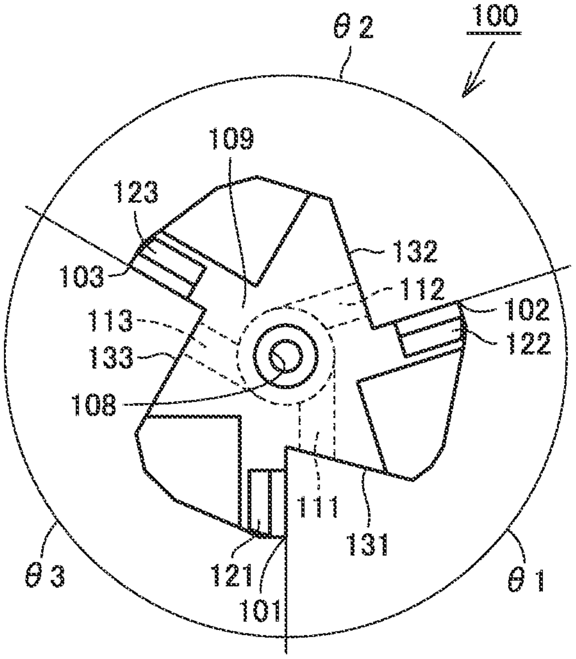
FIG. 5 is a side view of three-blade reamer 100 according to another embodiment.

FIG. 5 is a side view of three-blade reamer 100 according to another embodiment. As illustrated in FIG. 5, first chip 121 to third chip 123 are provided on the outer circumference of base metal 109 of reamer 100. First chip 121 to third chip 123 are provided with first cutting blade 101 to third cutting blade 103. First cutting blade 101 to third cutting blade 103 are portions that come into contact with the workpiece and process the workpiece. First chip 121 to third chip 123 are made of an ultra-hard tool material such as cemented carbide, diamond, or cubic boron nitride.

A rotation angle from first cutting blade 101 to second cutting blade 102 is 01, a rotation angle from second cutting blade 102 to third cutting blade 103 is θ2, and a rotation angle from third cutting blade 103 to first cutting blade 101 is θ3.

Base metal 109 is provided with three flutes 131 to 133. Three flutes 131 to 133 extend along a longitudinal direction of base metal 109.

Flutes 131 to 133 are provided with coolant holes 111 to 113 connected to hole 108. Accordingly, the coolant is supplied from hole 108 to coolant holes 111 to 113.

As an example, θ1 is 126±1°, θ2 is 126±1°, and θ3 is 108±1°.

Figure 6:
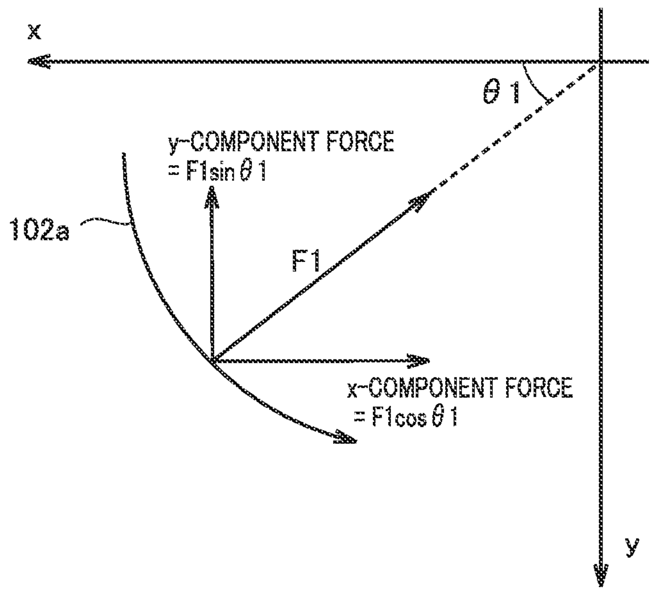
FIG. 6 is a diagram illustrating a resultant force of cutting resistance.

FIG. 6 is a diagram illustrating a resultant force of cutting resistance. A rotation track 102*a* of second cutting blade 102 is indicated by an arc.

The magnitude of the cutting resistance (thrust force) of second cutting blade 102 at a contact point with the workpiece is represented by F1. In a case where an x axis and a y axis are determined as illustrated in FIG. 6 by setting first cutting blade 101 as the x axis of a reference axis and setting an axis perpendicular to the x axis as the y axis, second cutting blade 102 forms an angle θ1 from the x axis that is the reference axis. An x-component force of F1 is −F1 cos θ1, and a y-component force is −F1 sin θ1.

The magnitude of the cutting resistance (thrust force) of third cutting blade 103 at a contact point with the workpiece is represented by F2. Third cutting blade 103 forms an angle θ1+θ2 from the x axis that is the reference axis. The x-component force of F2 is −F2 cos(θ1+θ2), and the y-component force is −F2 sin(θ1+θ2).

The magnitude of the cutting resistance (thrust force) of n-th cutting blade at a contact point with the workpiece is represented by Fn−1. The n-th cutting blade forms an angle θ1+θ2+ . . . +θn−1 from the x axis that is the reference axis. The x-component force of Fn−1 is −Fn−1 cos(θ1+θ2+ . . . +θn−1), and the y-component force is −Fn−1 sin(θ1+θ2+ . . . +θn−1).

The magnitude of the cutting resistance (thrust force) of first cutting blade 101 at a contact point with the workpiece is represented by Fn. First cutting blade 101 forms an angle θ1+θ2+ . . . +θn from the x axis that is the reference axis. The x-component force of Fn is −Fn cos(°1+°2+ . . . +θn), and the y-component force is −Fn sin(θ1+θ2+ . . . +θn).

The resultant force of the x component is −F1 cos 01−F2 cos(θ1+θ2)− . . . −Fn−1 cos(θ1+θ2+ . . . +θn−1)−Fn cos(θ1+θ2+ . . . +θn).

The resultant force of the y component is −F1 sin 01−F2 sin(θ1+θ2)− . . . −Fn−1 sin(θ1+θ2+ . . . +θn−1)−Fn sin(θ1+θ2+ . . . +θn).

It is assumed that the magnitudes of the cutting resistance F1 to Fn are proportional to cutting lengths θ1 to θn, and when an arbitrary constant is F, F1=F·θ2, F2=F·θ3, Fn−1=F·θn, and Fn=F·θ1.

Thus, the x resultant force is calculated as −F·θ2 cos θ1−F·θ3 cos(θ1+θ2)− . . . −F·θn cos(θ1+θ2+ . . . +θn−1)−F·θ1 cos(θ1+θ2+ . . . +θn)=−F{θ2 cos θ1+θ3 cos(θ1+θ2)+ . . . +θn cos(θ1+θ2+ . . . +θn−1)+θ1 cos(1+2+ . . . +θn)}.

When X(θ)=θ2 cos θ1+θ3 cos(1+θ2)+ . . . +θn cos(θ1+θ2+ . . . +θn−1)+θ1 cos(θ1+θ2+ . . . +θn), x resultant force=−F·X(θ) . . . . Expression (1) is obtained.

The y resultant force is calculated as −F·θ2 sin θ1−F·θ3 sin(θ1+θ2)− . . . −F·θn sin(θ1+θ2+ . . . +θn−1)−F·θ1 sin(θ1+θ2+ . . . +θn)=−F{θ2 sin θ1+θ3 sin(θ1+θ2)+ . . . +θn sin(θ1+θ2+ . . . +θn−1)+θ1 sin(θ1+θ2+ . . . +θn)}.

When Y(θ)=θ2 sin θ1+θ3 sin(θ1+θ2)+ . . . +θn sin(θ1+θ2+ . . . +θn−1)+θ1 sin(θ1+θ2+ . . . +θn), y resultant force=−F·Y(θ) . . . . Expression (2) is obtained.

When the resultant force is calculated from two Expressions (1) and (2), the resultant force is expressed by the following expression.

$$\text{Resultant Force} = F\{X(\theta)^2 + Y(\theta)^2\}^{1/2} \qquad \text{Expression (3)}$$

$$F(\theta) = \{X(\theta)^2 + Y(\theta)^2\}^{1/2} \qquad \text{Expression (4)}$$

In the rotary cutting tool of the present disclosure, three to five cutting blades are arranged at unequal intervals on the circumference. A rotation angle between each cutting blade and a cutting blade adjacent thereto is defined as an unequal flute spacing angle. The greatest common divisor of the unequal flute spacing angles is 12, 15, or 18, the maximum angular difference of the unequal flute spacing angles is greater than or equal to 15° and less than or equal to 40°, and a value of F(θ) represented by the expression of $F(\theta)=\{X(\theta)^2+Y(\theta)^2\}^{1/2}$ (here, when the maximum number of cutting blades is n, and the rotation angles of the first to n-th cutting blades are θ1 to θn, X(θ)=θ2 cos θ1+θ3 cos(θ1+θ2)+ . . . +θ1 cos(θ1+2+ . . . +θn), Y(θ)=θ2 sin θ1+θ3 sin(θ1+θ2)+ . . . +θ1 sin(θ1+θ2+ . . . +θn) is greater than or equal to 5.5 and less than or equal to 29.

The unequal flute spacing angle means that a certain flute spacing angle among a plurality of flute spacing angles of the plurality of cutting blades is different from another flute spacing angle. For example, in a case where the flute spacing angles are 90°, 90°, 70°, and 110° in four blades, the flute spacing angles are unequal flute spacing angles.

First Example

First, three-blade reamers (refer to FIGS. 1, 2, and 5) of sample numbers 1 to 8, 6-1, and 6-2 listed in Table 1 were prepared. The unit of θ is "°". Sample number 6-1 is obtained by changing angles θ1 to θ3 of sample number 6 within a range of ±1°. Sample number 6-2 is obtained by changing angles θ1 to θ3 of sample number 6 within a range of ±2°.

TABLE 1

| Sample Number | θ1 | θ2 | θ3 | F(θ) | Greatest Common Divisor | Maximum Angular Difference (°) |
|---|---|---|---|---|---|---|
| 1 | 120 | 120 | 120 | 0 | 120 | 0 |
| 2 | 105 | 130 | 125 | 23.2 | 5 | 25 |
| 3 | 135 | 105 | 120 | 29.7 | 15 | 30 |
| 4 | 120 | 100 | 140 | 37.4 | 20 | 40 |
| 5 | 110 | 130 | 120 | 19.1 | 36 | 20 |
| 6 | 126 | 126 | 108 | 18.6 | 18 | 18 |
| 7 | 120 | 108 | 132 | 22.8 | 12 | 24 |
| 8 | 105 | 135 | 120 | 28.3 | 15 | 30 |
| 6-1 | 127 | 126 | 107 | 20 | 1 | 20 |
| 6-2 | 128 | 126 | 106 | 21.4 | 2 | 22 |

"θ1" to "θ3" in Table 1 are θ1 to θ3 in FIG. 5. "F(θ)" is a value represented by Expression (4). A "greatest common divisor" is the greatest common divisor of θ1 to θ3. A "maximum angular difference" is the maximum angular difference of θ1 to θ3.

Using the reamers of sample numbers 1 to 8, 6-1, and 6-2, a processing test was conducted in which a pilot hole having an inner diameter of 11.2 mm was processed with the reamer to an inner diameter of 12 mm. Processing conditions are as follows.

Material of chip: polycrystalline diamond
Material of base metal: cemented carbide
Tool diameter D: 12 mm
Tool protrusion length L: 70 mm
Material of workpiece: ADC 12 (aluminum die casting)
Dimension and shape of pilot hole: blind hole having inner diameter of 11.2 mm and depth of 20 mm
Number of processes: 5
Peripheral speed: 249 m/min
Feed (mm/rev): 0.6 (3 blades), 0.8 (4 blades), 1 (5 blades)
Rotation speed: 6600 min-1
Machining depth: 18 mm
Equipment: vertical machining center (spindle BT30)
Cutting oil: emulsion-based water-soluble coolant dilution rate 10%

As a result of the cutting, the presence or absence of a feed mark on a cut surface was visually examined. Furthermore, a circularity of the processed hole was examined with a circularity/cylinder shape measuring machine. The circularity is a difference between radii of two concentric circles in a case where an interval between two concentric circles is minimized when a circular body is interposed between two concentric geometric circles in accordance with JIS B 0621-1984. The results are listed in Table 2.

TABLE 2

| Sample Number | Machining Surface Presence or Absence of Feed Mark | Circularity (μm) |
|---|---|---|
| 1 | Absent | 6.3 |
| 2 | Present | 3.0 |
| 3 | Present | 1.6 |
| 4 | Present | 2.6 |
| 5 | Present | 3.3 |
| 6 | Absent | 1.6 |
| 7 | Absent | 2.0 |
| 8 | Absent | 1.9 |
| 6-1 | Absent | 1.9 |
| 6-2 | Absent | 3.0 |

In Table 2, "circularity" is an average value of circularity of processed holes. The circularity was measured at the inlet, middle part, and inner part of each hole, and the largest value was taken as the circularity of the hole. In sample numbers 6 to 8 and 6-1, there was no feed mark, and the circularity showed a good value.

Second Example

Four-blade reamers (refer to FIGS. 1, 2, and 3) of sample numbers 11 to 30, 51 to 53, and 29-1 to 29-3 listed in Table 3 were prepared. Sample numbers 29-1 and 29-2 are obtained by changing angles θ1 to θ4 of sample number 29 within a range of ±1°. Sample number 29-3 is obtained by changing angles θ1 to θ4 of sample number 29 within a range of ±2°.

TABLE 3

| Sample Number | θ1 | θ2 | θ3 | θ4 | F(θ) | Greatest Common Divisor | Maximum Angular Difference (°) |
|---|---|---|---|---|---|---|---|
| 11 | 90 | 90 | 90 | 90 | 0 | 90 | 0 |
| 12 | 95 | 65 | 115 | 85 | 22.5 | 5 | 50 |
| 13 | 80 | 110 | 60 | 110 | 6 | 10 | 50 |
| 14 | 105 | 60 | 110 | 85 | 9.5 | 5 | 50 |
| 15 | 90 | 105 | 60 | 105 | 12.9 | 15 | 45 |
| 16 | 90 | 80 | 90 | 100 | 16.2 | 10 | 20 |
| 17 | 95 | 100 | 60 | 105 | 17.4 | 5 | 45 |
| 18 | 100 | 90 | 75 | 95 | 19.2 | 5 | 25 |
| 19 | 60 | 100 | 100 | 100 | 22.4 | 20 | 40 |
| 20 | 65 | 95 | 105 | 95 | 27.4 | 5 | 40 |
| 21 | 60 | 100 | 105 | 95 | 28 | 5 | 45 |
| 22 | 60 | 95 | 110 | 95 | 34.1 | 5 | 50 |
| 23 | 118 | 98 | 60 | 90 | 40.9 | 5 | 55 |
| 24 | 120 | 90 | 60 | 90 | 48 | 30 | 60 |
| 25 | 96 | 72 | 108 | 84 | 13.5 | 12 | 36 |
| 26 | 60 | 108 | 84 | 108 | 8.4 | 12 | 48 |
| 27 | 72 | 108 | 90 | 90 | 20 | 18 | 36 |
| 28 | 80 | 100 | 85 | 95 | 5.6 | 5 | 20 |
| 29 | 105 | 90 | 90 | 75 | 16.7 | 15 | 30 |
| 30 | 90 | 90 | 105 | 75 | 18.1 | 15 | 30 |
| 51 | 90 | 108 | 72 | 90 | 21.9 | 18 | 36 |
| 52 | 84 | 108 | 84 | 84 | 22.8 | 12 | 24 |
| 53 | 96 | 108 | 72 | 84 | 28.2 | 12 | 36 |
| 29-1 | 104 | 91 | 90 | 75 | 16.3 | 1 | 29 |
| 29-2 | 104 | 91 | 91 | 74 | 15.8 | 1 | 30 |
| 29-3 | 103 | 92 | 90 | 75 | 16 | 1 | 28 |

"θ1" to "θ4" in Table 3 are θ1 to θ4 in FIG. 3 "F(θ)" is a value represented by Expression (4). A "greatest common divisor" is the greatest common divisor of θ1 to θ4. A "maximum angular difference" is the maximum angular difference of θ1 to θ4. Using the reamers of sample numbers 11 to 30, 51 to 53, and 29-1 to 29-3, a processing test was conducted in which a pilot hole having an inner diameter of 11.2 mm was processed with the reamer to an inner diameter of 12 mm. Processing conditions are as described in the first example.

As a result of the cutting, the presence or absence of a feed mark on a cut surface was visually examined. Furthermore, a circularity of the processed hole was examined with a circularity/cylinder shape measuring machine. The results are listed in Table 4.

TABLE 4

| Sample Number | Machining Surface Presence or Absence of Feed Mark | Circularity (μm) |
|---|---|---|
| 11 | Absent | 4.7 |
| 12 | Present | 2.5 |

TABLE 4-continued

| Sample Number | Machining Surface Presence or Absence of Feed Mark | Circularity (μm) |
|---|---|---|
| 13 | Absent | 2.8 |
| 14 | | 2.6 |
| 15 | Present | 3.1 |
| 16 | | 3.1 |
| 17 | | 2.8 |
| 18 | | 2.9 |
| 19 | | 3.1 |
| 20 | | 3.0 |
| 21 | | 3.1 |
| 22 | | 3.2 |
| 23 | | 3.4 |
| 24 | | 4.4 |
| 25 | Absent | 2.0 |
| 26 | Present | 2.5 |
| 27 | Absent | 1.6 |
| 28 | | 5.4 |
| 29 | | 1.8 |
| 30 | | 1.7 |
| 51 | | 1.9 |
| 52 | | 1.7 |
| 53 | | 1.8 |
| 29-1 | | 2.0 |
| 29-2 | | 2.0 |
| 29-3 | | 3.5 |

In Table 4, "circularity" is an average value of circularity of processed holes. In sample numbers 25, 27, 29, 30, 51 to 53, 29-1, and 29-2, there was no feed mark, and the circularity showed a good value.

Third Example

Five-blade reamers (refer to FIGS. 1, 2, and 4) of sample numbers 31 to 46, and 40-1 to 40-3 listed in Table 5 were prepared. Sample numbers 40-1 and 40-2 are obtained by changing angles θ1 to θ5 of sample number 40 within a range of ±1°. Sample number 40-3 is obtained by changing angles θ1 to θ5 of sample number 40 within a range of ±2°.

TABLE 5

| Sample Number | θ1 | θ2 | θ3 | θ4 | θ5 | F(θ) | Greatest Common Divisor | Maximum Angular Difference (°) |
|---|---|---|---|---|---|---|---|---|
| 31 | 72 | 72 | 72 | 72 | 72 | 0 | 72 | 0 |
| 32 | 90 | 90 | 60 | 60 | 60 | 33.1 | 30 | 30 |
| 33 | 60 | 85 | 60 | 80 | 75 | 1.8 | 5 | 25 |
| 34 | 60 | 80 | 75 | 65 | 80 | 3.5 | 5 | 20 |
| 35 | 70 | 65 | 85 | 60 | 80 | 3.8 | 5 | 25 |
| 36 | 60 | 80 | 80 | 60 | 80 | 7.4 | 20 | 20 |
| 37 | 75 | 60 | 90 | 60 | 75 | 7.8 | 15 | 30 |
| 38 | 60 | 90 | 65 | 70 | 75 | 11 | 5 | 30 |
| 39 | 60 | 84 | 60 | 84 | 72 | 5.5 | 12 | 24 |
| 40 | 60 | 75 | 60 | 75 | 90 | 17.5 | 15 | 30 |
| 41 | 60 | 72 | 60 | 84 | 84 | 18.5 | 12 | 24 |
| 42 | 60 | 78 | 78 | 60 | 84 | 1.6 | 6 | 24 |
| 43 | 60 | 72 | 72 | 72 | 84 | 9.7 | 12 | 24 |
| 44 | 60 | 60 | 84 | 72 | 84 | 14.9 | 12 | 24 |
| 45 | 60 | 75 | 75 | 75 | 75 | 8.1 | 15 | 15 |
| 46 | 60 | 60 | 75 | 90 | 75 | 26 | 15 | 30 |
| 40-1 | 61 | 74 | 60 | 75 | 90 | 18.1 | 1 | 30 |
| 40-2 | 61 | 74 | 60 | 74 | 91 | 18.9 | 1 | 31 |
| 40-3 | 62 | 73 | 60 | 75 | 90 | 18.8 | 1 | 30 |

"θ1" to "θ5" in Table 5 are θ1 to θ5 in FIG. 4. "F(θ)" is a value represented by Expression (4). A "greatest common divisor" is the greatest common divisor of θ1 to θ5. A "maximum angular difference" is the maximum angular difference of θ1 to θ5. Using the reamers of sample numbers 31 to 46, and 40-1 to 40-3, a processing test was conducted in which a pilot hole having an inner diameter of 11.2 mm was processed with the reamer to an inner diameter of 12 mm. Processing conditions are as described in the first example.

As a result of the cutting, the presence or absence of a feed mark on a cut surface was visually examined. Furthermore, a circularity of the processed hole was examined with a circularity/cylinder shape measuring machine. The results are listed in Table 6.

TABLE 6

| Sample Number | Machining Surface Presence or Absence of Feed Mark | Circularity (μm) |
|---|---|---|
| 31 | Absent | 5.6 |
| 32 | Present | 2.6 |
| 33 | Absent | 2.5 |
| 34 | | 4.1 |
| 35 | | 3.4 |
| 36 | | 3.2 |
| 37 | | 1.9 |
| 38 | Present | 2.7 |
| 39 | Absent | 2.0 |
| 40 | | 1.5 |
| 41 | | 1.6 |
| 42 | | 2.5 |
| 43 | | 1.9 |
| 44 | | 1.7 |
| 45 | | 1.8 |
| 46 | | 1.7 |
| 40-1 | | 1.9 |
| 40-2 | | 2.0 |
| 40-3 | | 4.0 |

In Table 6, "circularity" is an average value of circularity of two processed holes. In sample numbers 37, 39 to 41, 43 to 46, 40-1, and 40-2, there was no feed mark, and the circularity showed a good value.

It was confirmed that the same effect was obtained not only in the reamer but also in other rotary cutting tools such as a drill and an end mill.

It should be understood that the embodiments and examples disclosed herein are illustrative in all respects and not restrictive. The scope of the present invention is defined not by the above description but by the claims, and is intended to include meanings equivalent to the claims and all modifications within the scope.

REFERENCE SIGNS LIST

100: reamer, 101: first cutting blade, 102: second cutting blade, **102*a*: rotation track, 103: third cutting blade, 104: fourth cutting blade, 105: fifth cutting blade, 106: tip portion, 107: base portion, 108: hole, 109: base metal, 111-115: coolant hole, 121: first chip, 122: second chip, 123: third chip, 124: fourth chip, 125: fifth chip, 131-135**: flute

The invention claimed is:

1. A rotary cutting tool in which three to five blades are arranged at unequal intervals on a circumference, wherein a rotation angle between each of the cutting blades and a cutting blade adjacent thereto is defined as an unequal flute spacing angle, and a greatest common divisor of the unequal flute spacing angles is 12, 15, or 18, a maximum angular difference of the unequal flute spacing angles is greater than or equal to 15° and less than or equal to 40°, and a value of F(θ) represented by an expression of $F(\theta)=\{X(\theta)^2+Y(\theta)^2\}^{1/2}$ (here, when a maximum number of cutting blades is n and rotation angles of the first to n-th cutting blades are θ1 to θn, X(θ)=θ2 cosθ1+θ3 cos (θ1+θ2)+ . . . +θ1 cos (θ1+θ2+ . . . +θn), Y(θ)=θ2 sinθ1+θ3 sin (θ1+θ2)+ . . . +θ1 sin (θ1+θ2+ . . . +θn)) is greater than or equal to 5.5 and less than or equal to 29.

2. The rotary cutting tool according to claim 1, further comprising a chip being provided with the cutting blade.

3. The rotary cutting tool according to claim 2, wherein the chip is provided on an outer circumference of a base metal.

4. The rotary cutting tool according to claim 2, wherein the chip is made of an ultra-hard tool material.

* * * * *